(12) United States Patent
Mader et al.

(10) Patent No.: US 9,582,979 B2
(45) Date of Patent: Feb. 28, 2017

(54) IMPROVING SAFETY ON SITES WITH MOVABLE OBJECTS

(71) Applicant: SAFEMINE AG, Baar (CH)

(72) Inventors: Urban Mader, Zurich (CH); Peter Arnold Stegmaier, Ponte Capriasca (CH); Urs Martin Rothacher, Thalwil (CH)

(73) Assignee: SAFEMINE AG, Baar (CH)

( * ) Notice: Subject to any disclaimer, the term of this patent is extended or adjusted under 35 U.S.C. 154(b) by 232 days.

(21) Appl. No.: 14/267,004

(22) Filed: May 1, 2014

(65) Prior Publication Data

US 2014/0333747 A1 Nov. 13, 2014

(30) Foreign Application Priority Data

May 7, 2013 (AU) ................................ 2013205744

(51) Int. Cl.
| | |
|---|---|
| G08B 21/06 | (2006.01) |
| G06K 9/00 | (2006.01) |
| B60L 3/02 | (2006.01) |
| B60L 1/00 | (2006.01) |
| B60K 28/06 | (2006.01) |

(52) U.S. Cl.
CPC .............. *G08B 21/06* (2013.01); *B60K 28/06* (2013.01); *G06K 9/00845* (2013.01)

(58) Field of Classification Search
CPC .............................. B60K 28/066; G08B 21/06
USPC .......................................................... 348/78
See application file for complete search history.

(56) References Cited

U.S. PATENT DOCUMENTS

| | | | |
|---|---|---|---|
| 5,465,079 A | 11/1995 | Bouchard et al. | |
| 5,729,619 A | 3/1998 | Puma | |
| 6,661,345 B1 | 12/2003 | Bevan et al. | |
| 6,927,694 B1 | 8/2005 | Smith et al. | |
| 7,183,932 B2 | 2/2007 | Bauer | |
| 8,022,831 B1* | 9/2011 | Wood-Eyre ............... | B60T 7/14 180/272 |
| 8,930,269 B2* | 1/2015 | He ....................... | B60K 28/066 705/39 |
| 9,198,575 B1* | 12/2015 | Blacutt .................. | A61B 3/113 |
| 2002/0145512 A1* | 10/2002 | Sleichter, III .......... | G08B 21/06 340/407.1 |

(Continued)

FOREIGN PATENT DOCUMENTS

| | | |
|---|---|---|
| CN | 201765668 U | 3/2011 |
| CN | 102208125 A | 10/2011 |
| EP | 2605228 A2 | 6/2013 |

OTHER PUBLICATIONS

Torbjorn Akerstedt et at al., Predictions from the Three-Process Model of Alertness, Aviation, Space, and Environmental Medicine, vol. 75, No. 3, Section II, Mar. 2004.

(Continued)

*Primary Examiner* — Hee-Yong Kim
(74) *Attorney, Agent, or Firm* — Marshall, Gerstein & Borun LLP

(57) ABSTRACT

In a system for supervising the safety on a site with at least one movable object, a drowsiness detection system is arranged at the movable object for supplying data related to a drowsiness state of an operator of the movable object. A monitoring system remote from the movable object receives the drowsiness state related data and logs and/or evaluates this drowsiness state related data.

21 Claims, 2 Drawing Sheets

(56) References Cited

U.S. PATENT DOCUMENTS

| | | | |
|---|---|---|---|
| 2003/0141762 A1* | 7/2003 | Sartori | G06K 9/00805 307/10.1 |
| 2005/0073136 A1* | 4/2005 | Larsson | A61B 3/113 280/735 |
| 2006/0012679 A1* | 1/2006 | Ressler | B60R 25/102 348/148 |
| 2007/0182529 A1 | 8/2007 | Dobler et al. | |
| 2008/0069403 A1* | 3/2008 | Breed | B60K 28/066 382/104 |
| 2009/0115638 A1* | 5/2009 | Shankwitz | G01C 21/26 340/988 |
| 2012/0169503 A1* | 7/2012 | Wu | G08B 21/06 340/575 |
| 2013/0159041 A1 | 6/2013 | Jayaraman et al. | |
| 2013/0176129 A1* | 7/2013 | Li | A61B 5/18 340/575 |
| 2014/0114532 A1* | 4/2014 | Choi | G08G 1/167 701/36 |

OTHER PUBLICATIONS

Jarek Krajewski et al., Steering Wheel Behavior Based Estimation of Fatigue, Proceedings of the Fifth International Driving Symposium on Human Factors in Driver Assessment, Training and Vehicle Design.

PERCLOS: A Valid Psychophysiological Measure of Alertness as Assessed by Psychomotor Vigilance, FHWA Contact: Ron Knipling, HCS-30, (202) 366-2981; NHTSA Contact: Paul Rau, NRD-13, (202) 366-0418, Office of Motor Carriers.

\* cited by examiner

IMPROVING SAFETY ON SITES WITH MOVABLE OBJECTS

CROSS REFERENCES TO RELATED APPLICATIONS

This application claims the priority of Australian patent application 2013205744, filed May 7, 2013, the disclosure of which is incorporated herein by reference in its entirety.

TECHNICAL FIELD AND BACKGROUND ART

The invention relates to a system and a method for supervising the safety on a site with at least one movable object.

Surface mines and similar sites or areas are generally operated by means of a large number of vehicles, some of which may be exceedingly large and difficult to control and have very limited visibility for the operator.

In case an operator of such a vehicle or other movable object becomes tired and possibly loses control over the vehicle, situations may occur in which the safety on the site may be at risk, i.e. the life of other persons working on the site may be at risk or damages may occur at the vehicle or other objects on the site.

DISCLOSURE OF THE INVENTION

According to an aspect of the invention a drowsiness detection system is provided for supplying data related to a drowsiness state of an operator of the movable object, and by a monitoring system.

A "movable object" in this context shall include any object that can change and is expected to change its position and/or orientation or configuration in space. It may e.g. be a truck or any other vehicle that moves from place to place and changes its orientation with respect to the general north-south direction, e.g. by steering, or it may be an object positioned at a fixed location but is able to rotate about its axis or is able to change its physical configuration, e.g. by extending an arm, in such a manner that the volume of safety space attributed to it varies in significant manner. In a preferred embodiment, the movable object is a mining vehicle, and especially is one of a vehicle, a crane, a dragline, a haul truck, an excavator and a shovel. A site is defined as an area of arbitrary size. In such area at least one, and preferably many movable objects are expected to be moved/operated. In a preferred embodiment, a site may be a defined area for a specific purpose, e.g. for construction purposes, or for mining purposes. However, the definition of a site may not only refer to premises but in another embodiment may also include public roads or other infrastructure, e.g. between several premises, and specifically between two or more mining premises, which roads may also be used by mining vehicles for travelling between the mining premises. Hence, in such scenario the site may cover the mining premises and the territory in between.

Typically, an operator is the person in charge for operating the movable object, and specifically for moving the object or at least parts of the object. The operator typically resides on the object while operating it. Once the operator is fatigued and loses alertness, he/she may cause collisions with other persons or objects which is desired to be avoided. Hence, the movable object contains the above mentioned drowsiness detection system. This system comprises means suitable for allowing detecting a drowsiness state of the operator. The means may comprise one or more sensors which sensors may either specifically be installed for the purpose of detecting the drowsiness state, or may be sensors available in the movable object anyway for other purposes which additionally allow for deducing a drowsiness state of the operator. The drowsiness detection means may additionally comprise an evaluation module, e.g. in form of a processor for either pre-processing signals from the one or more sensors, or for processing the sensor signals for identifying a specific drowsiness state of the operator.

The one or more sensors supply data that generally relates to the drowsiness state of the operator and hence falls under the term "drowsiness state related data". An interpretation/evaluation/classification of the data provided by the one or more sensors may result in an identified drowsiness state. Such identified drowsiness state may, for example, be one of "fully alert", "alert", "distracted", "easily distracted", "drowsy", "very drowsy" and "sleeping". It is noted that the identified drowsiness state also falls under the term "drowsiness state related data", which means that the drowsiness detection system may send one or more of the sensor data, an identified drowsiness state, or any other data related to the drowsiness state of the operator to the monitoring system, any of which data shall be subsumed under the term "drowsiness state related data".

The monitoring system is arranged remote from the movable object. The monitoring system may specifically be located in/at a supervisor location/building/room on site or off site, and specifically may comprise a computing system such as a server computer as recipient of the drowsiness state related data. The monitoring system preferably is linked to the movable object via a wireless interface for receiving the drowsiness state related data from the movable object, which wireless interface preferably is a bidirectional interface which also allows transmitting data from the monitoring system to the movable object. The monitoring system preferably is linked via such interface to many movable objects on site, and as such allows the supervision of safety relevant activities of many movable objects on the site.

It is indicated above, that in one embodiment the specific drowsiness state of the operator is identified from the drowsiness state related data in an evaluation module of the drowsiness detection system, and hence at the movable object. This embodiment allows for an immediate reaction to a critical identified drowsiness state of the operator at the movable object by issuing a warning to the operator. Such identified drowsiness state may also be sent to the remote monitoring system, along with or alternatively to the drowsiness state related data from the sensor/s for further observation by the supervisor. In another embodiment, the evaluation of the drowsiness state related data, and preferably the identification of the drowsiness state of the operator may be performed at the monitoring system, preferably automatically by an evaluation module which preferably is implemented in software.

In another embodiment, the monitoring system is adapted to log the received drowsiness state related data, possibly including the identified drowsiness state, for one or more of a deferred monitoring, evidence purposes, an offline evaluation, and statistics considerations. All these measures support supervising the safety on the site and support improving the safety by implementing means that may be based on the evaluation of the logged data. A report may be automatically generated based on this logged drowsiness state related data, such as a daily, weekly or monthly report.

In another embodiment, the or at least some of the received drowsiness state related data is displayed on a screen/display of the monitoring system in order to inform a supervising person. This supervisor may in dependence from the displayed data e.g. talk to the operator over the radio, and/or advise the operator to have a break, and/or to redirect the operator to another duty or to another job site.

In a preferred embodiment, the drowsiness detection system does not permanently supply the drowsiness state related data to the monitoring system but solely under defined conditions. Such condition may be that the drowsiness state identified at the movable object is critical enough to make the monitoring system and a possible supervisor at the monitoring system aware of this state. Here, the drowsiness detection system starts sending the drowsiness state related data, e.g. including the identified drowsiness state, to the monitoring system only in response to an identified critical drowsiness state, e.g. as soon as at least the state "drowsy" is identified.

It is emphasized, that the source of the drowsiness state related data based on which the specific drowsiness state is identified not necessarily coincides with the source of the drowsiness state related data that is sent to the monitoring system. For example, the drowsy state of the operator may be identified based on data stemming from a sensor for detecting a speed and/or an acceleration of the movable object. This may be based on the assumption that inadvertent speed and/or acceleration may indicate a drowsy operator. This identified drowsiness state in turn may trigger the transmission of drowsiness state related data to the monitoring system, which data, however, may stem from a different source, e.g. an onboard camera filming the operator. The pictures of the camera may then be used at the monitoring system for further automated evaluation, or for further inspection by a supervising person.

In another embodiment, the drowsiness detection system permanently supplies drowsiness state related data to the monitoring system, e.g. at least at defined intervals of a few minutes, for example.

In a further embodiment, the drowsiness detection system is adapted to send the drowsiness state related data to the monitoring system in response to a request from the monitoring system. Such request may be initiated at the monitoring system manually by the supervising person, or automatically based on fulfilling a request condition.

The above embodiments as to the timing of the sending of drowsiness state related data may be applied alone or in combination. In one embodiment, a frequency of a permanent transmission of data to be sent to the monitoring system may be increased subject to the identified drowsiness state. Or, a permanent transmission may be initiated subject to a trigger from the drowsiness detection system while previous to such trigger no drowsiness state related data is transmitted to the monitoring system.

In some preferred embodiments, the monitoring system may generate a warning subject to the received drowsiness state related data, and specifically subject to an identified drowsiness state that is considered to be critical, i.e. that fulfils a predefined condition. In one embodiment, the warning may be generated at the location of the monitoring system such that the supervisor becomes alert to the drowsy operator out there on the movable object. In another embodiment, a trigger for a warning is initiated at the monitoring system. Here, the monitoring system issues a trigger signal to the movable object via the interface for generating a warning there. The warnings may be any of an audible and/or a visual warning, and may or may not include instructions as to how to behave best in the present situation, and may automatically be generated.

In case the identification of the drowsiness state of the operator is performed by the drowsiness detection system at the movable object, in one embodiment, the monitoring system may provide support with respect to an adjustment of the identification/evaluation routine to be run at the drowsiness detection system. For example, the monitoring system may become aware that the movable object presently stays in a location known as blind spot. Then, it may be preferred that the monitoring system transmits a set of parameters optimized for this location to be applied in the drowsiness detection system. Hence, the monitoring system may support the drowsiness detection system in an adjustment of its routines dependent on the location of the movable object. The location of the movable object preferably is determined by suitable means, e.g. by means of a global positioning system a receiver for which is arranged at the movable object, and which location may be transmitted from the movable object to the monitoring system on a regular basis, for example.

The same approach may also be taken with respect to the weather, or to the present time. For example, the monitoring system may transmit another set of parameters to be applied in the drowsiness detection system during night compared to during the day, based on the assumption that during night the operator may in particular be inclined to be fatigued. The amendment of routines in the drowsiness detection system may, for example, refer to one or more of an adaptation to the states the drowsiness is classified into; an adaptation of the classification algorithm, an adaptation of a threshold for issuing a warning signal, an adaptation of a threshold for starting to send the data to the monitoring system, etc. In a basic example, the threshold at which the operator is to be warned may be lowered during night. Or, such threshold is lowered once the vehicle is identified at a blind spot.

On the other hand, the information mentioned above including one or more of the location of the movable object, and the time, may—in combination with the identified drowsiness state—be logged and accumulated to previous such data for allowing a manual or an automated evaluation: For example, the data may be sorted according to one of the above parameters and as such result in a location depend drowsiness characteristic, and/or a time dependent drowsiness characteristics. From these characteristics, the above mentioned different sets of parameters may be determined and be applied by the monitoring system and/or by the drowsiness detection system.

Hence, in a preferred embodiment the position of the movable object is identified and this position data is transmitted to the monitoring system where this information is logged in combination with an identified drowsiness state of the operator at this position of the movable object. The logged location/drowsiness data pairs may be transformed, e.g. into of a graphical map, specifically for identifying locations that correlate with higher identified drowsiness states than others. In the same way, the monitoring system may log an identified drowsiness state of the operator in combination with a time stamp for contributing to a data collection illustrating identified drowsiness states dependent on time. The logged data collection may show a course of drowsiness states across a day, etc. An adaptation may in a preferred embodiment also be suggested by a software engine analysing the data collection/s.

In a preferred embodiment, at least one sensor of the drowsiness detection system is a sensor for monitoring at least part of an area of activity of the operator. Data from such sensor may be sent as drowsiness state related data to the monitoring system. Specifically, such sensor may be a camera, wherein the one or more pictures taken by the camera may be sent as drowsiness state related data to the monitoring system. The camera may, for example, be a camera for monitoring an area in front of control means for controlling movements of the movable object which area is expected to be filled by the operator. In an even more sophisticated approach, the camera may be arranged and adapted to identify a state of the eyes of the operator. The camera may also be a front camera (mechanically) connected to a display for displaying safety and/or collision relevant information to the operator. Such approach may be beneficial based on the assumption that when a collision warning system already has issued a collision warning e.g. on the display, an alert operator is expected to look at the display in response to the collision warning.

In another preferred embodiment, the drowsiness detection system comprises an input unit, such as a switch or a touchscreen for activating or deactivating the drowsiness detection system. For privacy protection purposes, the operator preferably is enabled to switch off the drowsiness detection system. In one embodiment, the input unit may not only electrically switch off the drowsiness detection system but may also mechanically inhibit the drowsiness detection system to operate. For example, in case of a camera or another optical sensors provided for detecting the drowsiness state of the operator, in response to the operator operating the input unit for switching off the drowsiness detection system, the optical sensor, the camera, or any other sensor of the drowsiness detection system may be covered e.g. by a cover in order to become inoperable. Such means may enhance the credibility of the site operator towards the operators. However, it is preferred that such deactivation is logged at the monitoring system such that a supervisor is aware of the deactivation, or, that later on, it can be proved that the drowsiness detection system was deactivated for a certain period in time. Hence, in response to such deactivation a message is sent to the monitoring system. However, it is preferred that the drowsiness detection system is adapted to self activate in response to a start of an ignition or an engine of the movable vehicle. It is assumed that the operator may switch off the drowsiness detection system during a break. However, it is preferred that the drowsiness detection system is switched on again automatically when a state of the object is detected than indicates an upcoming operation and/or movement of the object.

In another embodiment, the drowsiness detection system comprises a means/sensor for detecting the usage of a cell phone in the operator environment. An operator using a cell phone may be classified as a distracted operator which inattentiveness may not be treated different than the fatigue such that presently inattentiveness is considered to be classified into the drowsiness states. The means for detecting the usage of a cell phone may include a receiver for radio frequency signals, and in particular may contain means for detecting events in the received radio frequency signals that indicate to phone calls. The means for detecting the usage of a cell phone may additionally or alternatively include a camera or another optical sensor, which may be the same camera or optical sensor that is also used for detecting a drowsy operator by filming his/her eyes and deriving the drowsiness there from, an evaluation of which camera pictures may detect that the operator holds his/her cell phone to close to the ear for calling or being called. The drowsiness detection system is adapted to send data related to a cell phone usage as drowsiness state related data to the monitoring system where this data may be treated in the same way as data stemming from other sensors of the drowsiness detection system.

In a preferred embodiment, the drowsiness detection system is adapted to send an identifier for the movable object in combination with the drowsiness state related data to the monitoring system. In case the monitoring system monitors multiple movable objects on a site, assigning the drowsiness state related data to a certain movable object, and preferably logging the data in combination with the object identifier, supports enhancing the safety on the site.

According to another aspect of the present invention, a method is provided for supervising the safety on a site with at least one movable object. At a monitoring system remote from the movable object, data is received related to a drowsiness state of an operator of the movable object. The received drowsiness state related data is logged and/or evaluated in the monitoring system.

According to a further aspect of the present invention, a computer program element is provided comprising computer program code means for performing the method according to any of the above embodiments when executed on a processing unit.

The described embodiments similarly pertain to the system, the method, and the computer program element. Synergetic effects may arise from different combinations of the embodiments although they might not be described in detail.

Other advantageous embodiments are listed in the dependent claims as well as in the description below.

BRIEF DESCRIPTION OF THE DRAWINGS

Embodiments of the invention are described in the following detailed description. Such description makes reference to the annexed drawings, wherein.

DETAILED DESCRIPTION OF THE DRAWINGS

Figure 1:
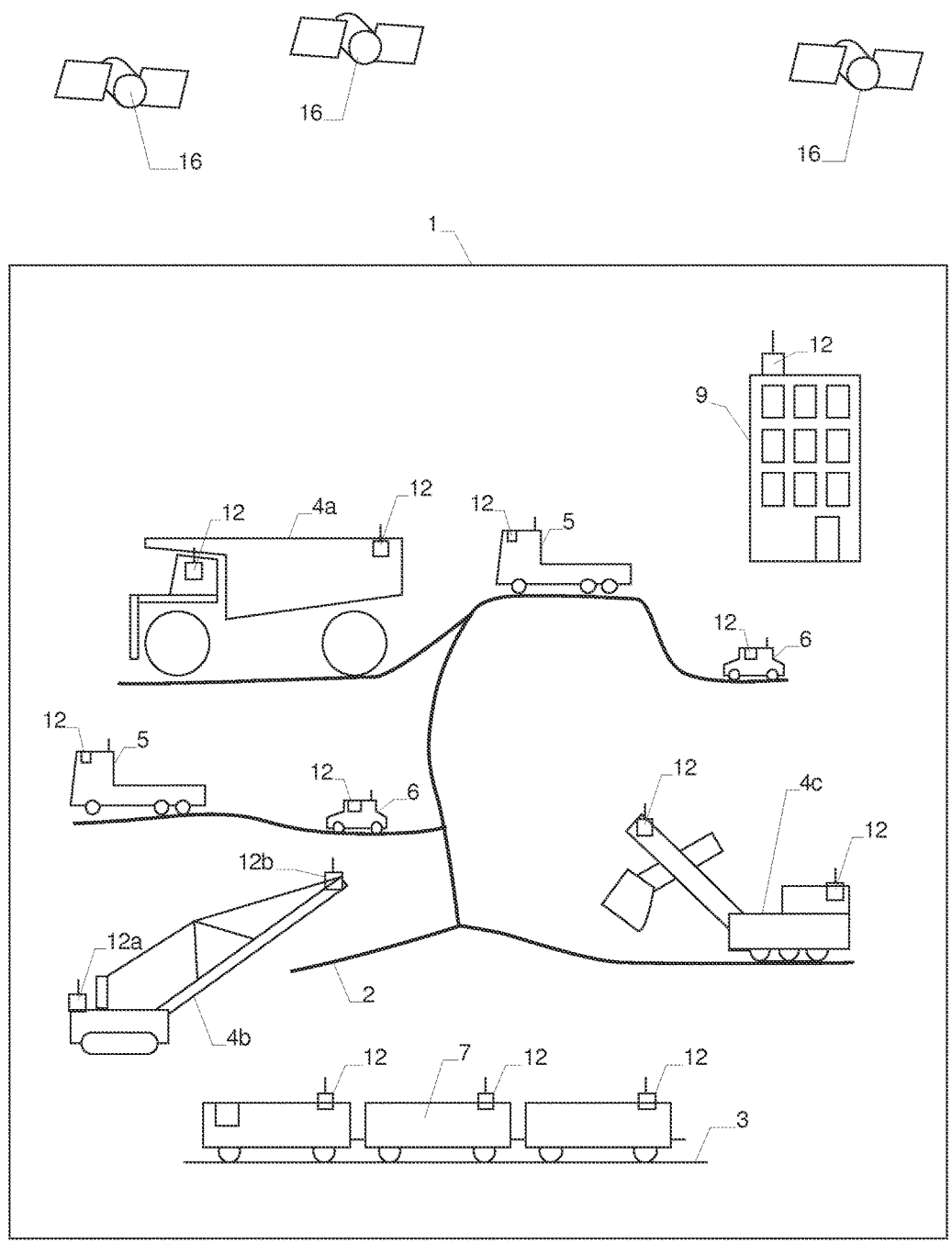
FIG. 1 shows a schematic representation of a site with movable objects containing a system according to an embodiment of the present invention.

FIG. 1 schematically depicts a site 1, such as a surface mine, with movable objects to which embodiments of the present invention may be applied. Typically, such a site covers a large area, in the case of a surface mine e.g. in the range of square kilometers, with a network of roads 2 and other traffic ways, such as rails 3. A plurality of objects is present in the mine, such as:

Large vehicles, such as haul trucks 4a, cranes 4b or excavators 4c. Vehicles of this type may easily weigh several hundred tons, and they are generally difficult to control, have very large breaking distances, and a large number of blind spots that the driver is unable to visually monitor without monitoring aids, such as e.g. cameras.

Medium sized vehicles 5, such as regular trucks. These vehicles are easier to control, but they still have several blind spots and require a skilled driver.

Small vehicles 6. Typically, vehicles of this type weigh 3 tons or less. They comprise passenger vehicles and small lorries.

Trains 7.

All the above objects may qualify as movable object. A further type of object within the mine is comprised of stationary obstacles, such as temporary or permanent buildings 9, open pits, boulders, non-movable excavators, stationary cranes, deposits, etc.

The risk of accidents in such an environment is high. In particular, the large sized vehicles can easily collide with other vehicles, or obstacles. For this reason, one, it is preferred that one, more or all objects in the mine 1 are provided with proximity determination means 12 that supports the generation of collision warnings for the personnel of the site, and in particular for operators of the movable objects, thereby reducing the risk of collisions and accidents. Specifically, a movable object may include means 12 comprising a receiver for a radio based positioning system interacting with satellites 16. This means 12 communicates in wireless manner, in particular by radio signals. Preferably, the means 12 comprises a GNSS receiver for identifying its position, i.e. the position of the assigned movable object. Further, the means 12 comprises a radio transceiver or circuit for exchanging data with other radio transceivers belonging to other objects. Hence, the means 12 preferably receive positional signals through the GNSS receiver and exchange data derived therefrom with via the transceiver with the transceivers of other objects in order to calculate relative positions and probabilities for collisions. In short, each means 12 obtains positional data derived from a signal from the GNSS receiver. This positional data allows determining the objects own position and is stored in a "status dataset". The status dataset also contains a unique identifier (i.e. an identifier unique to each of the means 12 used on the same site). The status dataset is emitted as a radio signal through the transceiver. At the same time, the transceiver receives status datasets from other objects, especially from neighbouring objects and therefore can calculate a relative distance to the other object/s by subtracting its own position coordinates from those of the other object/s, and can issue collision warnings.

Each of the movable objects on the present site preferably in addition comprises a system according to an embodiment of the present invention.

Figure 2:
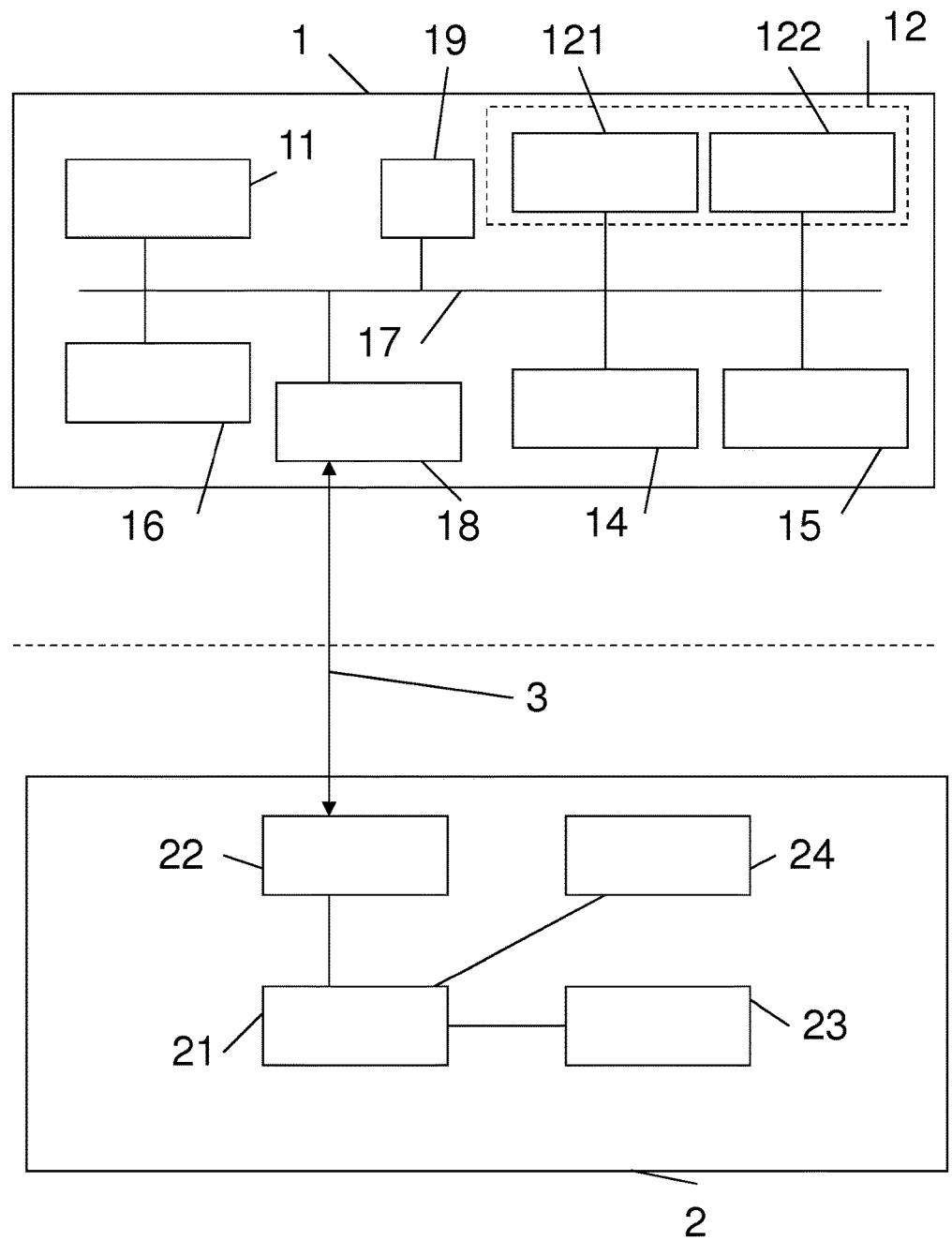
FIG. 2 is a block diagram of a system according to an embodiment of the present invention.

An exemplary system for supervising the safety on a site with at least one movable object according to an embodiment of the present invention is shown in a block diagram in FIG. 2. The system comprises a drowsiness detection system 1 which is assumed to be arranged in/at a movable object to be operated on the site. The drowsiness detection system 1 is connected via a wireless link 3 to a monitoring system 2.

The drowsiness detection system comprises a control unit 11 that in the present embodiment is connected via a bus 17 to various sensors and actors. The control unit 11 controls the operations of the drowsiness detection system 1, which at the same time includes a collision avoidance system in this embodiment, too as will be explained later on. The drowsiness detection system 1 comprises an optical sensor 14 such as a camera directed at an area of activity of the operator, and, for example, a sensor 15 for determining a speed of the vehicle, which sensor 15 however could be any other sensor for supplying drowsiness state relevant data. Both sensors 14 and 15 supply data related to a drowsiness state of the operator via the bus 17 to the control unit 11. The control unit 11 is connected to a wireless interface unit 18 for submitting drowsiness state related data to a wireless interface unit 22 of the monitoring system 2. The control unit 11 further is adapted to evaluate the data from one or both of the sensors 14 and 15 in order to identify a drowsiness state of the operator which identified drowsiness state preferably is sent to the monitoring system 2 via the wireless interface 3.

For example, the drowsiness state is identified any minute and is transmitted to the monitoring system 2 on a regular basis while the sensor data from the sensors 14 and 15 are not transmitted to the monitoring system 2 on a regular basis.

Whenever the control unit 11 of the drowsiness detection system 1 detects, that the identified drowsiness state shows a "drowsy" state or worse (similar to a threshold comparison), the control unit 11 triggers an alarm at an output unit 16 for warning the operator, and specifically for increasing the operator alertness.

The output unit 16 may in one embodiment comprise an acoustic signal source, such as a beeper, or a speaker, and/or may also contain visual warning elements such as one or more of an optical display, LED's or the like. The output unit 16 preferably is located at the area of activity of the operator which may be the cabin of a vehicle.

As indicated above, the present system may additionally include a collision warning system comprising means for determining the proximity of the movable object to one or more objects in the vicinity of the movable object, or parameters derivable therefrom such as a relative speed between these objects. The control unit 11 in one embodiment may additionally be adapted to determine the proximity, and in response to a critical proximity, speed, etc. may generate a collision warning in form of a signal supplied to the output device 16 for generating a visual or an audible alarm.

The means 12 for determining the proximity between the movable object and another object on the site may include a receiver 121 for identifying the position of the movable object, and a transceiver 122 for receiving positional information from other objects. The receiver 121 preferably is a receiver for a radio based positioning system, and specifically for a global navigation satellite system such as GPS. Hence the movable object is capable of determining its own position by means of the subject receiver 121 preferably adapted to interact with satellites of the corresponding GNSS, for example. The position of other objects in the vicinity of the movable object may be detected by means of receivers mounted to these other objects. The movable object then is in a position to determine the proximity to the other object/s based on the own position and the position/s from the other object/s as received. Alternatively, or in addition, the proximity determination means of the movable object may comprise a runtime measurement device for determining a distance of the movable object from the other object, which runtime measurement device may be one of a radio detection and ranging device, a light detection and ranging device, and a sound detection and ranging device. One or more such devices may be arranged around the movable object in order to identify objects approaching from either side.

In a preferred embodiment, the collision warning and the actual drowsiness detection interact beyond sharing the control unit 11 and the output unit 16 in that once a collision warning is issued to the operator, e.g. via the output unit 16, the drowsiness detection system 1 monitors for a reaction of the operator in response to the collision warning. The camera 14 may, for example, be mounted to the operators cab for monitoring a reaction of the operator. The camera 14 or the control unit 11 may in this case include an image recognition module, which allows for better identifying reactions of the operator in response to a collision warning. For example, if the camera 14 only shows a person in the operators area of activity who does not move/react at all in response to a collision warning issued by the output unit 16, the control unit 11 may determine that the operator is in a fatigued state and may generate a drowsiness warning via the output unit 16 to the operator, and may send this identified drowsiness state of the operator via the wireless interface 3 to the monitoring system 2. The pictures taken by the camera 14 may be sent to the monitoring system 2 in response to the collision warning being generated or in response to the drowsiness warning being generated, or in response to both.

The monitoring system 3 may, for example, be a computing system and contain a control unit 21, the wireless interface unit 22, a display 23, and a storage 24.

The monitoring system 2 generally may log the drowsiness state related data into the storage 24. The monitoring system 2 may visualize the received drowsiness state related data on the display 23 for allowing a supervisor to react. The control unit 21 of the monitoring system may also evaluate the received drowsiness state related data, preferably in an automated fashion, and may subject to a result of the evaluation automatically initiate actions such as one or more of: issuing a warning on the display 23 or an audible warning; sending a trigger signal via the wireless interface 3 to the drowsiness detection system 1 for having a warning being issued there via the output unit 16; requesting further drowsiness state related data from the drowsiness detection system 1, possibly from a different sensor; sending an emergency signal to the drowsiness detection system 1 for triggering one or more of reducing the speed of the vehicle, stopping the vehicle, etc.

Returning to the drowsiness detection system 1, a switch 19 may be provided for deactivating the drowsiness detection system 1 in order to allow the operator to switch off the monitoring of his person. It is preferred that a message is sent to the monitoring system 2 indicating the drowsiness detection system 1 is switched off.

The invention claimed is:

1. A system for supervising the safety on a site with at least one movable object,
    comprising at the movable object: a drowsiness detection system for supplying data related to a drowsiness state of an operator of the movable object, the drowsiness detection system including at least one sensor for detecting a drowsiness state of the operator,
    comprising remote from the movable object: a monitoring system in communication with the drowsiness detection system,
    wherein the drowsiness detection system is adapted to send the drowsiness state related data to the monitoring system,
    wherein the monitoring system is adapted to log and/or evaluate the drowsiness state related data,
    wherein the movable object comprises a positioning device for identifying a position of the movable object,
    wherein the drowsiness detection system is adapted to send data related to the position of the movable object to the monitoring system,
    wherein the monitoring system is adapted to log an identified drowsiness state of the operator in combination with a time stamp for contributing to a data collection illustrating identified drowsiness states dependent on time and
    wherein the monitoring system is adapted to log the identified drowsiness state of the operator in combination with the position data of the movable object for contributing to a data collection illustrating identified drowsiness states dependent on positions of the movable object, the identified drowsy state is selected from a group consisting of "fully alert", "alert", "distracted", "easily distracted", "drowsy", "very drowsy", and "sleeping".

2. The system according to claim 1,
    wherein the drowsiness detection system is adapted to start sending the drowsiness state related data to the monitoring system dependent on an identified drowsiness state of the operator, and in particular if the identified drowsiness state fulfills a condition.

3. The system according to claim 1,
    wherein the drowsiness detection system is adapted to send the drowsiness state related data to the monitoring system in response to a request from the monitoring system.

4. The system according to claim 1,
    wherein the monitoring system is adapted to generate a warning at a location of the monitoring system dependent on the drowsiness state related data.

5. The system according to claim 4,
    wherein the monitoring system is adapted to send a trigger signal to the movable object for generating a warning for the operator in response to the drowsiness state related data, and in particular if an identified drowsiness state of the operator fulfills a condition.

6. The system according to claim 1,
    wherein the monitoring system is adapted to send parameters to the drowsiness detection system for adapting an operation of the drowsiness detection system which parameters are dependent on one or more of:
    the position of the movable object;
    the present time;
    weather conditions.

7. The system according to claim 1,
    wherein the at least one sensor is configured for monitoring at least part of an area of activity of the operator, and
    wherein the drowsiness detection system is adapted to send data from the sensor or an identified drowsiness state derived from the sensor data as drowsiness state related data to the monitoring system,
    and in particular
    wherein the sensor is a camera, and
    wherein the drowsiness detection system is adapted to send one or more pictures taken by the camera or information retrieved from the one or more pictures as drowsiness state related data to the monitoring system.

8. The system according to claim 7,
    wherein the drowsiness detection system is adapted to send the one or more pictures taken by the camera to the monitoring system in response to a collision warning generated by a collision warning system and/or in response to a drowsiness warning generated by the drowsiness detection system.

9. The system according to claim 7,
    wherein the camera includes one or more of:
    a camera for monitoring an area in front of control means for controlling movements of the movable object;
    a front camera connected to a display for displaying safety and/or collision relevant information to the operator;
    a camera for identifying a state of the eyes in the face of the operator.

10. The system according to claim 7,
    wherein the drowsiness detection system includes a sensor for detecting a speed and/or an acceleration of the movable object, and wherein the drowsiness detection system is adapted to send the one or more pictures taken by the camera to the monitoring system in response to the detected speed and/or acceleration fulfilling a condition.

11. The system according to claim 1,
wherein the drowsiness detection system comprises an input unit for activating or deactivating the drowsiness detection system,
wherein the drowsiness detection system is adapted to transmit a message in response to its deactivation to the monitoring system.

12. The system according to claim 11,
wherein the drowsiness detection system is adapted to self activate in response to a start of an ignition or an engine of the movable vehicle.

13. The system according to claim 1,
wherein the drowsiness detection system comprises a means for detecting the usage of a cell phone in the operators environment, and
wherein the drowsiness detection system is adapted to send data related to the cell phone usage as drowsiness state related data to the monitoring system.

14. The system according to claim 1,
wherein the site includes a mining site,
wherein the movable object is a mining vehicle, and in particular is one of a vehicle, a crane, a dragline, a haul truck, an excavator and a shovel, and
wherein the drowsiness detection system is adapted to send an identifier for the movable object in combination with the drowsiness state related data to the monitoring system.

15. The system according to claim 1,
wherein the drowsiness state related data contains an identified drowsiness state of the operator, and
wherein the monitoring system contains a computing system for executing its tasks.

16. The system according to claim 1, wherein the at least one sensor is configured for monitoring at least part of an area of activity of the operator.

17. The system according to claim 1, wherein the drowsiness detection system further comprises a control unit to evaluate the data from the at least one sensor to identify the drowsiness state of the operator.

18. The system according to claim 1, wherein the at least one sensor is at least one optical sensor.

19. A method for supervising the safety on a site with at least one movable object, comprising the steps of
providing at least one sensor at a movable object,
using the at least one sensor for detecting a drowsiness state of an operator of the movable object,
receiving data related to a drowsiness state of the operator of the movable object at a monitoring system remote from the movable object,
logging and/or evaluating the received drowsiness state related data,
providing at the movable object a positioning device for identifying a position of the movable object,
sending data related to the position of the movable object to the monitoring system,
logging an identified drowsiness state of the operator in combination with a time stamp for contributing to a data collection illustrating identified drowsiness states dependent on time, and
logging the identified drowsiness state of the operator in combination with the position data of the movable object for contributing to a data collection illustrating identified drowsiness states dependent on positions of the movable object, the identified drowsy state is selected from a group consisting of "fully alert", "alert", "distracted", "easily distracted", "drowsy", "very drowsy", and "sleeping".

20. The method according to claim 19, wherein the at least one sensor is used for monitoring at least part of an area of activity of the operator of the movable object.

21. A non-transitory, tangible computer readable medium having instructions stored thereon, that when executed by one or more processors, causes the one or more processors to:
use at least one sensor at a movable object for detecting a drowsiness state of an operator of the movable object,
receive data related to a drowsiness state of the operator of the movable object at a monitoring system remote from the movable object,
log and/or evaluate the received drowsiness state related data, and
use a position device at the movable object for identifying a position of the movable object,
send data related to the position of the movable object to the monitoring system,
log an identified drowsiness state of the operator in combination with a time stamp for contributing to a data collection illustrating identified drowsiness states dependent on time, and
log the identified drowsiness state of the operator in combination with the position data of the movable object for contributing to a data collection illustrating identified drowsiness states dependent on positions of the movable object, the identified drowsy state is selected from a group consisting of "fully alert", "alert", "distracted", "easily distracted", "drowsy", "very drowsy", and "sleeping".

* * * * *